(12) United States Patent
Lee

(10) Patent No.: US 12,589,692 B2
(45) Date of Patent: Mar. 31, 2026

(54) APPARATUS FOR DRIVER ASSISTANCE AND METHOD OF CONTROLLING THE SAME

(71) Applicant: HL KLEMOVE CORP., Incheon (KR)

(72) Inventor: Dokyung Lee, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 263 days.

(21) Appl. No.: 18/211,237

(22) Filed: Jun. 16, 2023

(65) Prior Publication Data

US 2024/0059326 A1     Feb. 22, 2024

(30) Foreign Application Priority Data

Aug. 19, 2022    (KR) ........................ 10-2022-0104281

(51) Int. Cl.
*B60Q 1/50* (2006.01)
*B60W 10/04* (2006.01)
(Continued)

(52) U.S. Cl.
CPC ............ *B60Q 1/507* (2022.05); *B60W 10/04* (2013.01); *B60W 10/20* (2013.01); *B60W 60/005* (2020.02); *B60W 60/0059* (2020.02); *G06V 20/58* (2022.01); *G08G 1/096725* (2013.01); *G08G 1/096791* (2013.01); *B60Q 2400/50* (2013.01); *B60W 2420/403* (2013.01); (Continued)

(58) Field of Classification Search
CPC ... B60Q 1/507; B60Q 2400/50; B60W 10/04; B60W 10/20; B60W 60/005; B60W 60/0059; B60W 2420/403; B60W 2420/408; B60W 2552/53; B60W 2556/45; B60W 2556/65; G06V 20/58; G06V 20/588; G06V 2201/08; G08G 1/096725; G08G 1/096791
See application file for complete search history.

(56) References Cited

U.S. PATENT DOCUMENTS 10,045,173 B1 *  8/2018  Morimura .............. B60Q 1/525
10,252,721 B1 *  4/2019  Bai ........................ B60Q 1/508
(Continued)

FOREIGN PATENT DOCUMENTS

DE     102017010495 A1 *  5/2018  ............... B60Q 1/50
JP     2021-39561      3/2021
(Continued)

*Primary Examiner* — Justin R. Blaufeld
(74) *Attorney, Agent, or Firm* — WOMBLE BOND DICKINSON (US) LLP

(57) ABSTRACT

In an assist apparatus for travel of a vehicle, the assist apparatus may include a camera installed on a vehicle, having a field outside view of the vehicle, and configured to obtain image data, a radar installed on the vehicle, having a sensing area outside the vehicle, and configured to obtain radar data, a communication part configured to transmit and receive communication data to and from a nearby vehicle or external server, and a processor configured process at least one piece of data of the image data, the radar data, and the communication data, wherein the processor recognizes an autonomous driving level of the nearby vehicle on the basis of processing the data and can monitor whether the nearby vehicle needs assistance in response to the autonomous driving level recognized as a lower level than the vehicle.

16 Claims, 9 Drawing Sheets

(51) Int. Cl.
| | |
|---|---|
| *B60W 10/20* | (2006.01) |
| *B60W 60/00* | (2020.01) |
| *G06V 20/56* | (2022.01) |
| *G06V 20/58* | (2022.01) |
| *G08G 1/0967* | (2006.01) |

(52) U.S. Cl.
CPC ... *B60W 2420/408* (2024.01); *B60W 2552/53* (2020.02); *B60W 2556/45* (2020.02); *B60W 2556/65* (2020.02); *G06V 2201/08* (2022.01)

(56) References Cited

U.S. PATENT DOCUMENTS

| | | | | |
|---|---|---|---|---|
| 11,292,494 | B2 * | 4/2022 | Kim | B60W 60/0017 |
| 2016/0229395 | A1 * | 8/2016 | Schmüdderich | G08G 1/167 |
| 2017/0361762 | A1 * | 12/2017 | Wunsche, III | B62D 15/026 |
| 2018/0056851 | A1 * | 3/2018 | Kim | B60Q 1/143 |
| 2018/0173237 | A1 * | 6/2018 | Reiley | B60Q 1/5035 |
| 2018/0297470 | A1 * | 10/2018 | Kim | B60Q 1/085 |
| 2018/0328563 | A1 * | 11/2018 | Park | G06V 20/56 |
| 2020/0207360 | A1 * | 7/2020 | Dougherty | G08G 1/22 |
| 2020/0341465 | A1 * | 10/2020 | Yun | B60W 50/14 |
| 2021/0122398 | A1 * | 4/2021 | Kim | B60W 60/0053 |
| 2021/0170942 | A1 * | 6/2021 | Mimura | B60Q 9/00 |
| 2021/0370982 | A1 * | 12/2021 | Kasahara | G08G 1/096716 |
| 2022/0063675 | A1 * | 3/2022 | Mimura | B60Q 1/545 |
| 2022/0144307 | A1 * | 5/2022 | Jung | B60W 60/0055 |

FOREIGN PATENT DOCUMENTS

| | | | | |
|---|---|---|---|---|
| KR | 10-2020-0010654 | | 1/2020 | |
| KR | 20200010654 | A * | 1/2020 | G05D 1/0231 |
| KR | 10-2021-0052621 | | 5/2021 | |

* cited by examiner

APPARATUS FOR DRIVER ASSISTANCE AND METHOD OF CONTROLLING THE SAME

CROSS-REFERENCE TO RELATED APPLICATION

This application claims the benefit of Korean Patent Application No. 10-2022-0104281, filed on Aug. 19, 2022 in the Korean Intellectual Property Office, the disclosure of which is incorporated herein by reference.

BACKGROUND

1. Field

Embodiments of the present disclosure relate to an apparatus which monitors a nearby vehicle having a lower autonomous driving level than a host vehicle and assists travel of the host vehicle, and a method of controlling the same.

2. Description of the Related Art

In modern society, vehicles are the most common means for transportation, and the number of people using vehicles is increasing. With the development of vehicle technology, there are advantages of ease of long-distance travel, easier life, and the like, but in densely populated places such as Korea, there are problems that road traffic conditions degrade and serious traffic jams occur frequently.

Recently, studies on a vehicle on which an advanced driver assist system (ADAS) configured to actively provide information on the state of a vehicle, the state of a driver, and a surrounding environment to reduce the burden of the driver and improve convenience of the driver is mounted have actively been carried out.

As examples of the ADAS mounted on the vehicle, there are a forward collision avoidance (FCA) system, an autonomous emergency brake (AEB) system, a driver attention warning (DAW) system, and the like. Such systems are collision avoidance and attention warning systems configured to determine a collision risk with an object in a traveling situation of the vehicle, and perform emergency braking in a collision situation.

However, the conventional technology has a problem that a technical problem of a lower autonomous driving level vehicle cannot be supplemented in a critical situation.

SUMMARY

Therefore, it is an aspect of the present disclosure to provide an apparatus capable of supplementing a technical problem in a critical situation of a lower autonomous driving level vehicle to assist travel of the vehicle and a method of controlling the same.

In accordance with one aspect of the present disclosure, a driver assist apparatus configured to assist travel of a vehicle includes a camera installed on a vehicle, having a field of view outside the vehicle, and including at least one image sensor configured to obtain image data, a radar installed on the vehicle, having a sensing area outside the vehicle, and including at least one antenna configured to receive a reflection radar signal that is a reflected signal of a transmission signal, and at least one processor configured to obtain information on an object around the vehicle on the basis of processing the image data and obtain information on the object around the vehicle on the basis of processing the reflection radar signal. The at least one processor processes the information on the object around the vehicle and the communication data which is received from a nearby vehicle or an external server through a communication part of the vehicle, identifies an autonomous driving level of the nearby vehicle on the basis of processing the information on the object around the vehicle and the communication data, and changes an autonomous driving level of the vehicle in response to the autonomous driving level of the nearby vehicle identified as a lower level than the autonomous driving level of the vehicle.

The at least one processor may attempt communication with the nearby vehicle through the communication part and identify the autonomous driving level of the nearby vehicle as the lower level on the basis of no reception of a response from the nearby vehicle.

The at least one processor may identify a vehicle type and a model year of the nearby vehicle on the basis of processing the image data and identify the autonomous driving level of the nearby vehicle on the basis of the vehicle type and the model year of the nearby vehicle.

The at least one processor may monitor whether the nearby vehicle needs assistance on the basis of processing at least one of the image data and the communication data.

The at least one processor may determine that the nearby vehicle needs the assistance in response to no recognition of a lane line in front of the vehicle.

The at least one processor may control a projection unit of the vehicle to project a virtual lane line of the nearby vehicle in the case in which the nearby vehicle needs the assistance.

The at least one processor may determine that the nearby vehicle needs the assistance in response to reception of information on an accident in front of the vehicle from an external server.

The at least one processor may control a driving system and a steering system to guide a route of the nearby vehicle in the case in which the nearby vehicle needs the assistance.

The at least one processor may provide a signal to control a projection unit of the vehicle to project a virtual lane line to guide a route of the nearby vehicle in the case in which the nearby vehicle needs the assistance.

In accordance with another aspect of the present disclosure, a method includes obtaining image data by a camera installed on a vehicle, obtaining radar data by a radar installed on the vehicle, receiving communication data with a nearby vehicle or external server, obtaining information on an object around the vehicle on the basis of processing the image data, obtaining information on the object around the vehicle on the basis of processing the reflection radar signal, processing the information on the object around the vehicle and the communication data, identifying an autonomous driving level of the nearby vehicle on the basis of processing the information on the object around the vehicle and the communication data, and changing an autonomous driving level of the vehicle in response to an autonomous driving level of the nearby vehicle identified as a lower level than the autonomous driving level of the vehicle.

The identifying of the autonomous driving level of the nearby vehicle may include attempting communication with the nearby vehicle, and identifying the autonomous driving level of the nearby vehicle as the lower level on the basis of no reception of a response from the nearby vehicle.

The identifying of the autonomous driving level of the nearby vehicle may include identifying a vehicle type and a model year of the nearby vehicle on the basis of processing the image data, and identifying the autonomous driving level of the nearby vehicle on the basis of the vehicle type and the model year of the nearby vehicle.

The changing of the autonomous driving level of the vehicle may include monitoring whether the nearby vehicle needs assistance on the basis of processing at least one of the image data and the communication data.

The changing of the autonomous driving level of the vehicle may include determining that the nearby vehicle needs the assistance in response to no recognition of a lane line in front of the vehicle.

The method may further include providing a signal to control a projection unit of the vehicle to project a virtual lane line of the nearby vehicle in the case in which the nearby vehicle needs the assistance.

The changing of the autonomous driving level of the vehicle may further include determining that the nearby vehicle needs the assistance in response to reception of information on an accident in front of the vehicle from an external server.

The method may further include controlling a driving system and a steering system to guide a route of the nearby vehicle in the case in which the nearby vehicle needs the assistance.

The method may further include providing a signal to control a projection unit of the vehicle to project a virtual lane line to guide a route of the nearby vehicle in the case in which the nearby vehicle needs the assistance.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
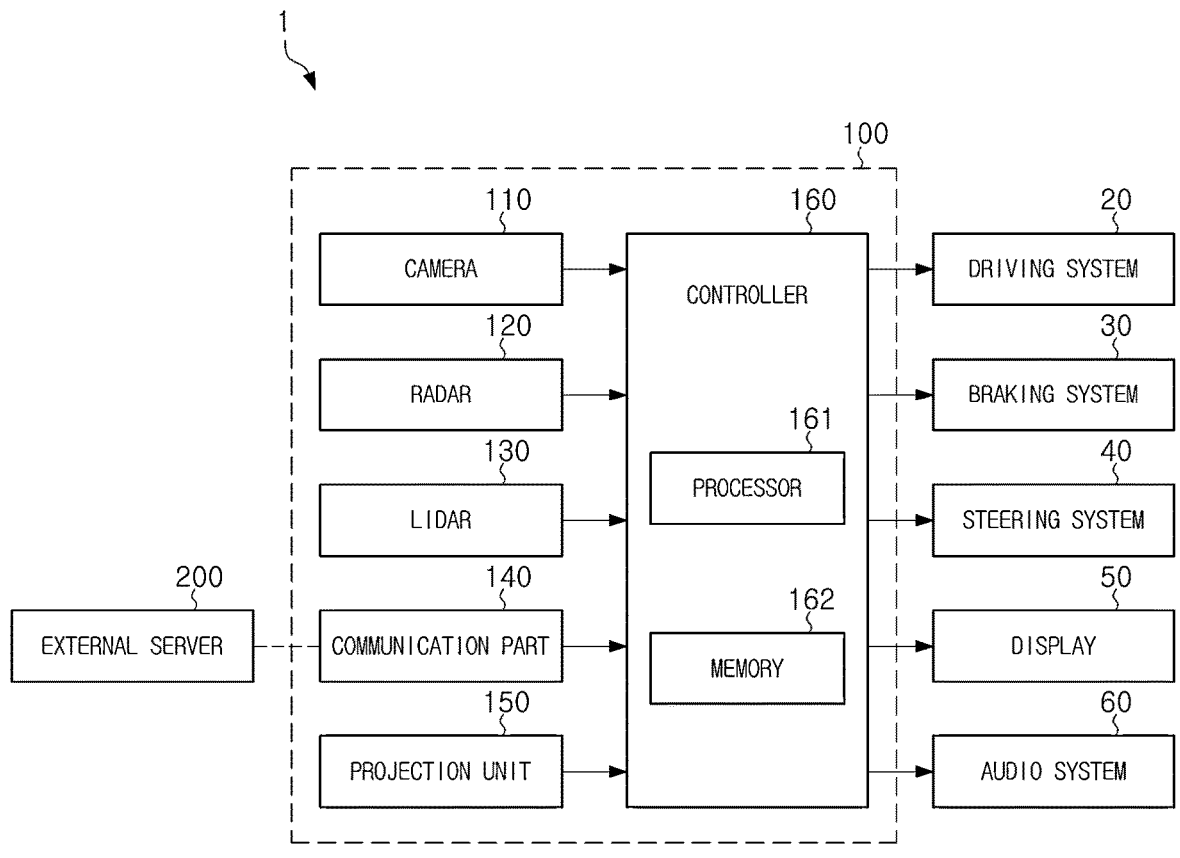
FIG. 1 is a view illustrating a configuration of a vehicle and a driver assist apparatus according to one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
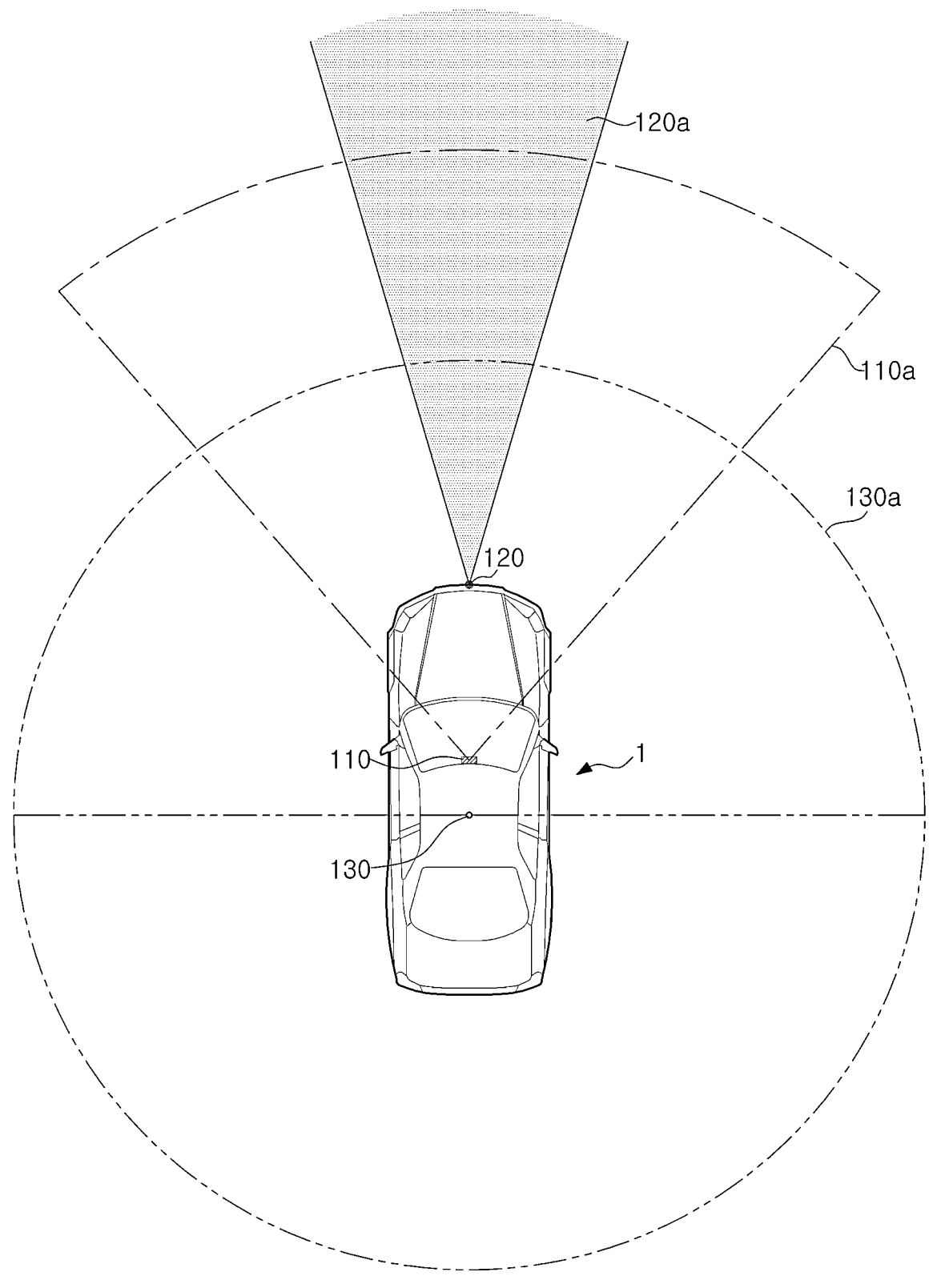
FIG. 2 is a view illustrating fields of view of a camera and a radar included in the driver assist apparatus according to one embodiment.

FIG. 1 is a view illustrating a configuration of a vehicle and a driver assist apparatus according to one embodiment. FIG. 2 is a view illustrating fields of view of a camera and a radar included in the driver assist apparatus according to one embodiment.

As illustrated in FIG. 1, a vehicle 1 may include a driving system 20, a braking system 30, a steering system 40, and/or a driver assist apparatus 100. The driving system 20, the braking system 30, the steering system 40, and/or the driver assist apparatus 100 may communicate with each other through a vehicle communication network (NT). For example, the electrical systems 20, 30, 40, and 100 included in the vehicle 1 may transmit and receive data through Ethernet, media-oriented systems transport (MOST), FlexRay, a controller area network (CAN), a local interconnect network (LIN), or the like.

The driving system 20 moves the vehicle 1 and may include, for example, an engine, an engine management system (EMS), a transmission, and a transmission control unit (TCU). The engine generates power for the vehicle 1 to travel, and the EMS may control the engine in response to the driver's acceleration intention through an accelerator pedal or a request from the driver assist apparatus 100. The transmission decelerates and transmits power generated by the engine to wheels, and the TCU may control the transmission in response to a shift command of a driver through a shift lever and/or a request from the driver assist apparatus 100.

The braking system 30 brakes the vehicle 1 and may include, for example, a brake caliper and an electronic brake control module (EBCM). The brake caliper may use friction with a brake disc to decelerate the vehicle 1 or stop the vehicle 1, and the EBCM may control the brake caliper in response to the driver's braking intention through the brake pedal and/or a request from the driver assist apparatus 100. For example, the EBCM may receive a deceleration request including a deceleration speed from the driver assist apparatus 100 may electrically or hydraulically control the brake caliper to decelerate the vehicle 1 according to the requested deceleration.

The steering system 40 may include an electronic power steering (EPS) control module. The steering system 40 may change a traveling direction of the vehicle 1, and the EPS control module may assist an operation of the steering system 40 in response to the driver's steering intention through a steering wheel so that the driver may easily operate the steering wheel. In addition, the EPS control module may control the steering system in response to a request from the driver assist apparatus 100. For example, the EPS control module may receive a steering request including a steering torque from the driver assist apparatus 100 and control the steering system to steer the vehicle 1 according to the requested steering torque.

The driver assist apparatus 100 may communicate with the driving system 20, the braking system 30, the steering system 40, a display 50, and an audio system 60 through a vehicle communication network.

The vehicle 1 and a server 200 may be connected to each other through a communication part 140 using a network. The network is a connectivity structure which allows information exchange between nodes such as terminals and servers and includes a local area network (LAN), a wide area network (WAN), Internet (world wide web (WWW)), a wired and wireless data communication network, a telephone network, a wired and wireless television network, or the like. Examples of wireless data communication networks include 3$^{rd}$ generation (3G), 4$^{th}$ generation (4G), 5$^{th}$ generation (5G), and 3$^{rd}$ generation partnership project (3GPP) long term evolution (LTE), world interoperability for microwave access (WIMAX), wireless fidelity (Wi-Fi), Bluetooth communication, infrared communication, ultrasonic communication, visible light communication (VLC), light fidelity (LiFi) wireless data communication networks, and the like.

The server 200 may process various levels of data, store data, and transmit and/or receive processed data.

More specifically, the server 200 may transmit and receive communication data to and from the vehicle 1. In this case, the communication data may include, for example, a request for autonomous driving level information corresponding to a vehicle number and autonomous driving level information corresponding to the request. In addition, the communication data may include information on an accident or an obstacle on a road corresponding to a position of the vehicle 1. Accordingly, the vehicle 1 may receive the autonomous driving level information corresponding to the vehicle number, and may receive the information on the accident around the vehicle 1 and/or obstacle on the road.

The driver assist apparatus 100 may provide various functions for safety to the driver. For example, the driver assist apparatus 100 may provide lane departure warning (LDW), lane keeping assist (LKA), high beam assist (HBA), autonomous emergency braking (AEB), traffic sign recognition (TSR), adaptive cruise control (ACC), and blind spot detection (BSD) functions, and the like.

The driver assist apparatus 100 may include a camera 110, a radar 120, a LiDAR 130, and a controller 160. The driver assist apparatus 100 is not limited to those illustrated in FIG. 1. For example, in the driver assist apparatus 100 illustrated in FIG. 1, at least one detection device among the camera 110, the radar 120, and the LiDAR 130 may be omitted, or various detection device configured to detect an object around the vehicle 1 may be added.

The camera 110 may capture an image around the vehicle 1 and obtain image data around the vehicle 1. For example, as illustrated in FIG. 2, the camera 110 may be installed on a front windshield of the vehicle 1 and may have a field of view 110a outside the vehicle 1. However, the present invention is not limited to the illustrated field of view 110a, and it may be understood that the number of cameras 110 may optionally be changed by a user, and thus positions thereof may also be changed.

The camera 110 may include a plurality of lenses and an image sensor. The image sensor may include a plurality of photodiodes which convert light into an electrical signal, and the plurality of photodiodes may be disposed in the form of a two-dimensional matrix. The image data may include information on another vehicle, a pedestrian, a cyclist, or a lane marker (distinguishing lane lines) positioned around the vehicle 1.

The camera 110 may be electrically connected to the controller 160. For example, the camera 110 may be connected to the controller 160 through the vehicle communication network (NT) or a hard wire. The camera 110 may transmit the image data around the vehicle 1 to the controller 160.

The radar 120 may emit transmission radio waves from the vehicle 1 toward surroundings and detect a nearby object of the vehicle 1 on the basis of reflected radio waves reflected from the nearby object. For example, as illustrated in FIG. 2, the radar 120 may be installed on a grille or bumper of the vehicle 1 and may have a sensing area 120a outside the vehicle 1.

The radar 120 may include a transmitting antenna (or transmitting antenna array) configured to emit transmission radio waves from the vehicle 1 toward the surroundings and a receiving antenna (or receiving antenna array) configured to receive reflection radio waves reflected by an object.

The radar 120 may obtain radar data from the transmission radio waves transmitted by the transmitting antenna and the reflection radio waves received by the receiving antenna. The radar data may include position information (for example, distance information) and/or speed information of objects in front of the vehicle 1.

The radar 120 may be connected to the controller 160, for example, through the vehicle communication network (NT) or a hard wire and may transmit the radar data to the controller 160.

The LiDAR 130 may emit light (for example, infrared light) toward the surroundings from the vehicle 1 and detect an object near the vehicle 1 on the basis of reflection light reflected from the nearby object. For example, the LiDAR 130 may be mounted on a roof of the vehicle 1 as illustrated in FIG. 2 and may have a sensing area 130a of the vehicle 1 in all directions toward the surroundings.

The LiDAR 130 may include a light source (for example, a light emitting diode, a light emitting diode array, a laser diode, or a laser diode array) configured to emit light (for example, infrared light) and a light sensor (for example, a photodiode or a photodiode array) configured to receive light (for example, infrared light). In addition, as necessary, the LiDAR 130 may further include a driving system configured to rotate the light source and/or the light sensor.

The LiDAR 130 may emit light using the light source and receive light reflected from an object using the light sensor while the light source and/or the light sensor rotates and thus obtain LiDAR data. The LiDAR data may include relative positions (distances to nearby objects and/or directions toward the nearby objects) and/or relative speeds of the nearby objects around the vehicle 1.

For example, the LiDAR 130 may be connected to the controller 160 through the vehicle communication network (NT) or a hard wire and may transmit the LiDAR data to the controller 160.

The communication part 140 may include a communication interface including a communication port, which connects a corresponding communication network and a remote control apparatus, and a receiver configured to receive a communication signal according to at least one of an ultrawide band (UWB) communication part, a Bluetooth low energy (BLE) communication part, a near field communication (NFC) communication part, a low frequency (LF) communication part, and a radio frequency (RF) communication part. In addition, the communication part 140 may further include a communication signal conversion module configured to demodulate the communication signal received through the communication interface into a control signal according to the control of the controller 160.

The communication part 140 may transmit and receive communication data to and from a nearby vehicle 2 and/or the server 200. More specifically, the communication part 140 may receive a searching response signal of the nearby vehicle 2 which responds to a searching signal of the vehicle 1. The searching response signal is a communication signal that the nearby vehicle 2 transmits to the vehicle 1 so that the vehicle 1 confirms that the nearby vehicle 2 has received the searching signal from the vehicle 1.

As described above, communication signals may be transmitted, and a searching signal for searching for the nearby vehicle 2 and a searching response signal of which formats are changed according to at least one of the UWB communication part, the BLE communication part, the NFC communication part, the RF communication part, and the LF communication part included in the communication part 140.

Meanwhile, for example, the searching signal and the searching response signal may have different formats.

Meanwhile, the communication part 140 may include at least one antenna (not shown) and communicate with the nearby vehicle 2 through the antenna. In this case, it may be understood that the antenna (not illustrated) may be the receiver included in the communication interface as described above.

In addition, the communication part 140 may transmit a communication signal from the nearby vehicle 2 to the controller 160 and/or an electronic control unit (ECU) of the vehicle 1.

Accordingly, the controller 160 may recognize an autonomous driving level of the nearby vehicle 2 on the basis of communication data including the searching signal from the communication part 140 and the searching response signal. In this case, the autonomous driving level may be an autonomous driving level of the vehicle. That is, a higher autonomous driving vehicle may be an autonomous driving vehicle capable of more stable autonomous driving because an advanced driver assist system (ADAS) serves on the basis of more sensors and/or information.

More specifically, when the controller 160 transmits a searching signal to the nearby vehicle 2 and does not receive a response signal from the nearby vehicle 2, the controller 160 may recognize that an autonomous driving level of the nearby vehicle 2 is a lower level. In this case, it may be assumed that communication between vehicles is inactive in the case of a lower autonomous driving level vehicle.

As another embodiment, the controller 160 may recognize an autonomous driving level of a nearby vehicle 2 on the basis of a response signal of the nearby vehicle 2 to correspond to a searching signal and on the basis of an autonomous driving level included in the response signal. However, the present invention is not limited thereto.

As still another embodiment, the controller 160 may recognize a vehicle type and/or a model year of a nearby vehicle 2 on the basis of results of processing data received from a camera 110, a radar 120, and/or a LiDAR 130. Accordingly, the controller 160 may recognize an autonomous driving level of the nearby vehicle 2 on the basis of prestored autonomous driving level data according to a vehicle type and/or a model year.

In addition, the controller 160 may recognize a vehicle number of a nearby vehicle on the basis of results of processing image information obtained from a camera 110. Accordingly, the controller 160 may also recognize an autonomous driving level of the nearby vehicle by receiving an autonomous driving level corresponding to the vehicle number of the nearby vehicle through a communication part 140.

A projection unit 150 may be, for example, a projector. As an example, the projection unit 150 may be provided at a lower end of a left door and/or a lower end of a right door of the vehicle 1 and project an image to the surroundings from the vehicle 1.

For example, the projection unit 150 may project a virtual lane line to the surroundings from the vehicle 1 on the basis of a control signal of the controller 160.

The projection unit 150 may be a projector of at least one of a CRT level projector, a liquid crystal display (LCD) level projector, and a digital light processing (DLP) level projector. However, the present invention is not limited thereto, and it may be understood that any projector conventionally known in the art or to be developed in the future may be applied to the projection unit 150.

The controller 160 may be electrically connected to the camera 110, the radar 120, the LiDAR 130, the communication part 140, and/or the projection unit 150. In addition, the controller 160 may be connected to the driving system 20, the braking system 30, the steering system 40, the display 50, and the audio system 60 through the vehicle communication network (NT).

The controller 160 may process image data of the camera 110, radar data of the radar 120, and/or LiDAR data of the LiDAR 130 and provide control signals to the driving system 20, the braking system 30, and/or the steering system 40.

The controller 160 may include a memory 162 and a processor 161.

The memory 162 may store a program and/or data for processing the image data, the radar data, and/or the LiDAR data. Additionally, the memory 162 may store a program and/or data for generating driving/braking/steering signals.

The memory 162 may temporarily store the image data received from the camera 110, the radar data received from the radar 120, and/or the LiDAR data received from the LiDAR 130 and may temporarily store results of processing the image data, the radar data, and/or the LiDAR data by the processor 161.

The memory 162 may include not only a volatile memory such as a static-random access memory (S-RAM) or a dynamic-random access memory (D-RAM) but also a non-volatile memory such as a flash memory, a read only memory (ROM), or an erasable programmable read only memory (EPROM).

The processor 161 may process the image data of the camera 110, the radar data of the radar 120, and/or the LiDAR data of the LiDAR 130. The processor 161 may generate a driving signal, a braking signal, and/or a steering signal for controlling the driving system 10, the braking system 30, and/or the steering system 40, respectively, on the basis of the results of processing the image data of the camera 110, the radar data of the radar 120, and/or the LiDAR data of the LiDAR 130.

For example, the processor 161 may include an image processor configured to process the image data of the camera 110, a signal processor configured to process the radar data of the radar 120, and/or the LiDAR data of the LiDAR 130, or a micro control unit (MCU) configured to generate the drive/brake/steering signals.

The processor 161 may perform sensor fusion that the image data, the radar data, and/or the LiDAR data are fused to detect objects around the vehicle 1.

For example, the processor 161 may recognize relative positions (distances from the vehicle and angles of traveling directions) and kinds (for example, whether objects are other vehicles, or pedestrians, cyclists, or the like) of objects in front of the vehicle 1 on the basis of image data. The processor 161 may recognize relative positions and relative speeds of objects in front of the vehicle 1 on the basis of radar data and LiDAR data. In addition, the processor 161 may match objects recognized on the basis of the radar data with objects recognized on the basis of the image data and objects recognized on the basis of the LiDAR data, and obtain kinds, relative positions, and relative speeds of the objects around the vehicle 1 on the basis of the matched objects.

The processor 161 may estimate a collision risk between the vehicle 1 and the nearby objects on the basis of the relative positions and the relative speeds of the objects around the vehicle 1. For example, the processor 161 may calculate a time to collision (TTC, or distance to collision (TTD)) between the vehicle 1 and a nearby object on the basis of a position (distance) and a relative speed of the object around the vehicle 1 and estimate a collision risk between the vehicle 1 and the nearby object on the basis of the TTC. The processor 161 may determine that as a TTC is smaller, a collision risk is high.

The processor 161 may select a target object among objects around the vehicle 1 on the basis of the collision risk. For example, the processor 161 may select the target object among the objects on the basis of TTC between the vehicle 1 and the nearby objects.

The processor 161 may generate a driving signal, a braking signal, or a steering signal on the basis of the collision risk with the target object. For example, the processor 161 may warn the driver of a collision or transmit a braking signal to the braking system 30 on the basis of a comparison between the TTC, between the vehicle 1 and the target object, and a reference time. In addition, the processor 161 may transmit a steering signal to the steering system 40 to avoid the collision with the target object on the basis of the comparison between the TTC, between the vehicle 1 and the target object, and the reference time.

A specific operation of the driver assist apparatus 100 will be described in more detail below.

Figure 3:
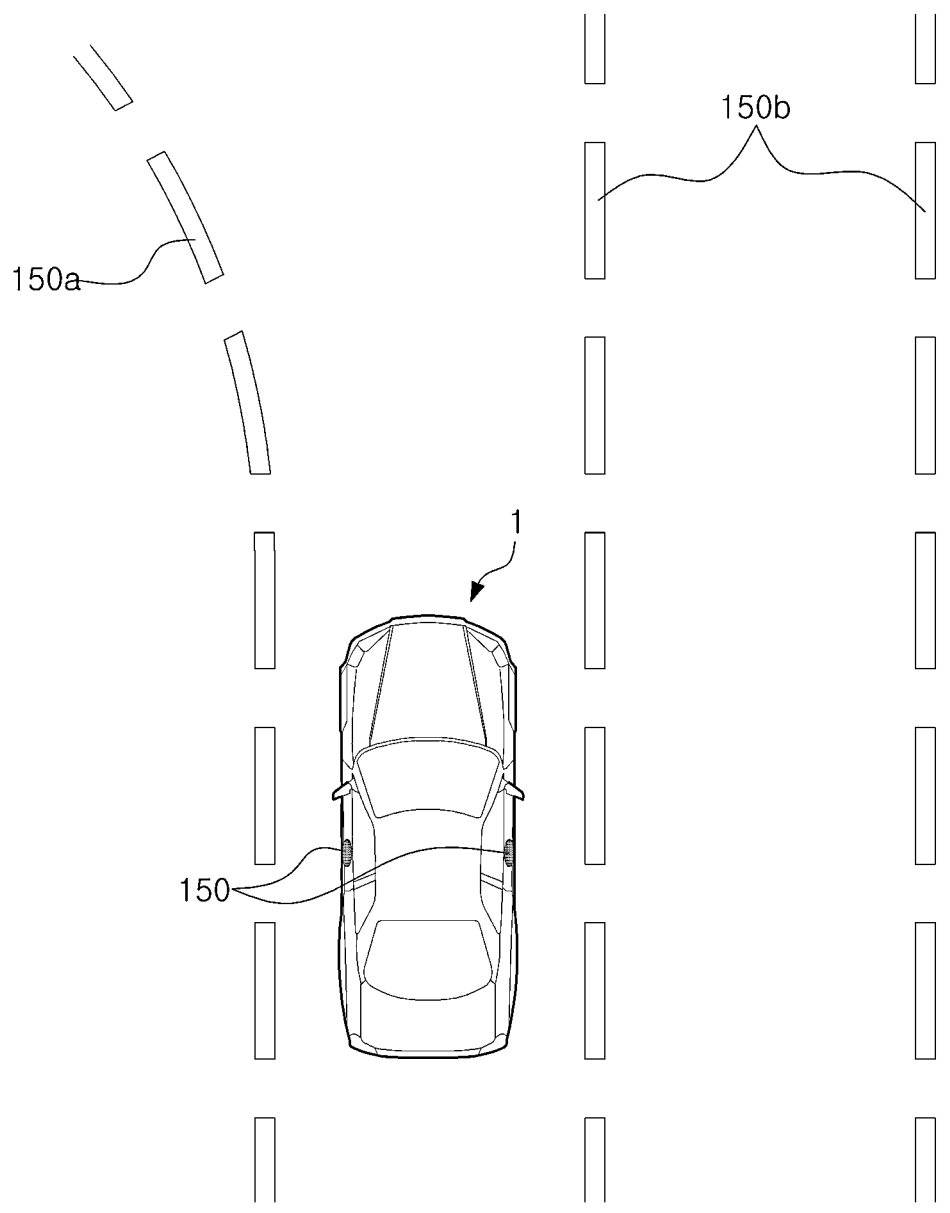
FIG. 3 is a view for describing an example of the driver assist apparatus which assists a nearby vehicle according to one embodiment.

FIG. 3 is a view for describing an example of the driver assist apparatus which assists a nearby vehicle according to one embodiment.

Referring to FIG. 3, the driver assist apparatus 100 may generate a control signal to control the projection unit 150 to project virtual lane lines 150a and 150b. Various levels of virtual lane lines, for example, dashed lines, solid lines, double solid lines, or the like may be projected.

As an example, the driver assist apparatus 100 may generate a control signal to control the projection unit 150 to project a virtual lane line 150a so that a nearby vehicle, which is traveling from behind the vehicle 1 along a left lane of a lane along which the vehicle 1 is traveling, moves to the left as illustrated in the drawing. Accordingly, the autonomous vehicle traveling from behind and along the left lane of the vehicle 1 may move to the left lane on the basis of the virtual lane line 150a projected by the projection unit 150.

In addition, the driver assist apparatus 100 may generate a control signal to control the projection unit 150 to project a virtual lane line 150b parallel to the lane along which vehicle 1 is traveling as illustrated in the drawing. Accordingly, an autonomous vehicle traveling along a right lane of the vehicle 1 may perform autonomous driving on the basis of the virtual lane line 150b projected by the projection unit 150.

Figure 4:
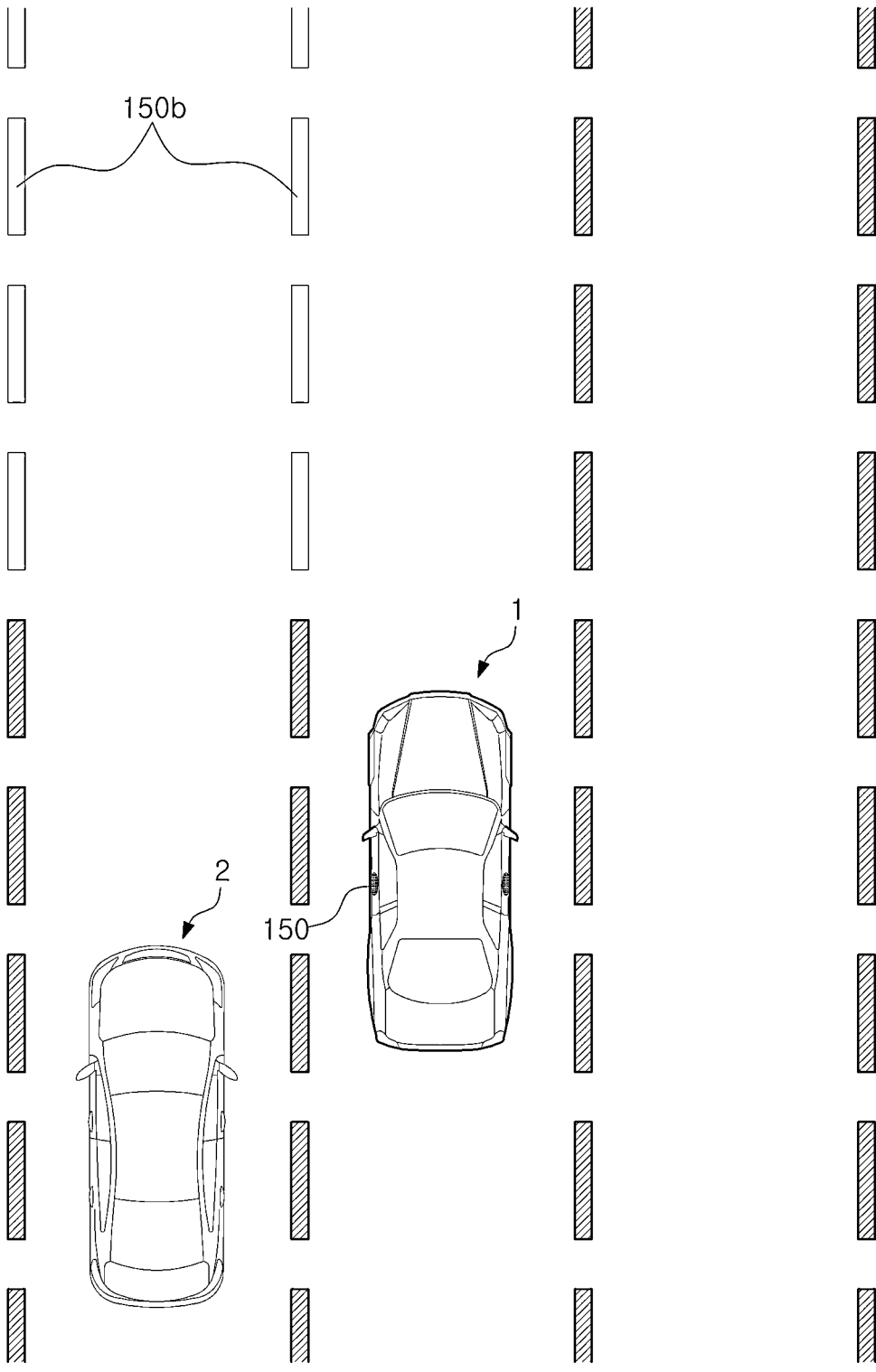
FIG. 4 is a view for describing an example of the driver assist apparatus which assists a nearby vehicle according to one embodiment.

FIG. 4 is a view for describing an example of the driver assist apparatus which assists a nearby vehicle according to one embodiment.

Referring to FIG. 4, the driver assist apparatus 100 may recognize an autonomous driving level of a nearby vehicle 2 on the basis of results of processing data received from at least one of the camera 110, the radar 120, the lidar 130, and the communication part 140. Accordingly, the driver assist apparatus 100 may monitor whether the nearby vehicle 2 needs assistance.

More specifically, in response to a lower autonomous driving level vehicle 2 around the vehicle 1, the driver assist apparatus 100 may recognize whether a road in front of vehicle 1 is present or not on the basis of the results of processing the data received from at least one of the camera 110, the radar 120, and the LiDAR 130.

As illustrated in FIG. 4, in response to the lower autonomous driving level vehicle 2 around the vehicle 1 and in response to absence of the road in front of the vehicle 1, the driver assist apparatus 100 may determine that the nearby vehicle 2 needs assistance.

In this case, the driver assist apparatus 100 may generate a signal to control the projection unit 150 to project a virtual lane line 150b that may replace the nonexistent road in front of the nearby vehicle 2. Accordingly, the nearby vehicle 2 can perform autonomous driving even when there is no road.

Figure 5:
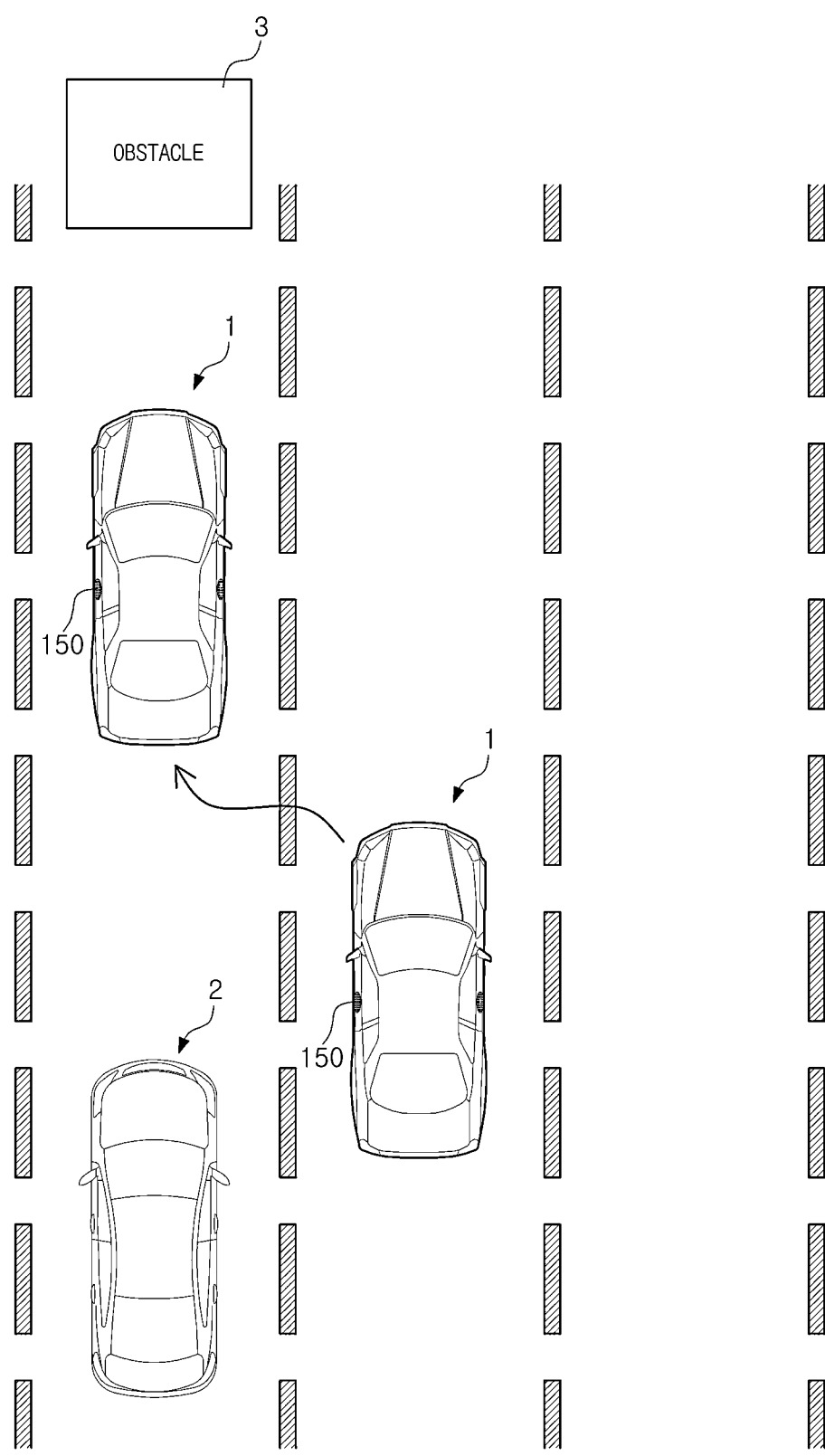
FIG. 5 is a view for describing an example of the driver assist apparatus which assists a nearby vehicle according to one embodiment.

FIG. 5 is a view for describing an example of the driver assist apparatus which assists a nearby vehicle according to one embodiment;

Referring to FIG. 5, the driver assist apparatus 100 may recognize an autonomous driving level of a nearby vehicle 2 on the basis of results of processing data received from at least one of the camera 110, the radar 120, the lidar 130, and the communication part 140. Accordingly, the driver assist apparatus 100 may monitor whether the nearby vehicle 2 needs assistance.

More specifically, in response to the lower autonomous driving level vehicle 2 around the vehicle 1, the driver assist apparatus 100 may recognize an obstacle 3 in front of the vehicle 1 on the basis of the results of processing the data received from at least one of the camera 110, the radar 120, and the LiDAR 130. In this case, the driver assist apparatus 100 may determine that the nearby vehicle 2 needs assistance. However, the present invention is not limited thereto.

As another embodiment, a driver assist apparatus 100 may recognize an obstacle 3 in front of a vehicle 1 on the basis of results of processing communication data received from a communication part 140. More specifically, in the case of a nearby vehicle 2 having a lower autonomous driving level, there are problems that the number of levels of obstacles which may be recognized on the basis of a camera is small and an accident risk becomes high in the case of unlearned obstacles (for example, an overturned vehicle). To solve these problems, the driver assist apparatus 100 receives information on an accident in front of the vehicle 1 from the communication part 140, and based on this, the driver assist apparatus 100 may receive the information on the accident in front of the vehicle 1 in advance to assist travel of the nearby vehicle 2.

More specifically, in response to recognition of the presence of the obstacle 3 in front of the vehicle 1, the driver assist apparatus 100 may generate a signal to control forward steering and traveling of the nearby vehicle 2 to guide deceleration and/or avoidance of the nearby vehicle 2.

For example, in response to a distance between the obstacle 3 in front of the vehicle 1 and the nearby vehicle 2 being smaller than a predetermined distance, the driver assist apparatus 100 may generate a steering and/or driving control signal to allow the vehicle 1 to move and travel in a forward direction of the nearby vehicle 2. However, the present invention is not limited thereto, and on the basis of the distance between the obstacle 3 and the nearby vehicle 2, when the distance is greater than the predetermined distance, a steering and/or driving control signal may be generated to allow the vehicle 1 to move and travel, and when the distance is smaller than the predetermined distance, a control signal may be generated to provide a warning sound such as a horn and/or a warning light to the nearby vehicle 2.

Figure 6:
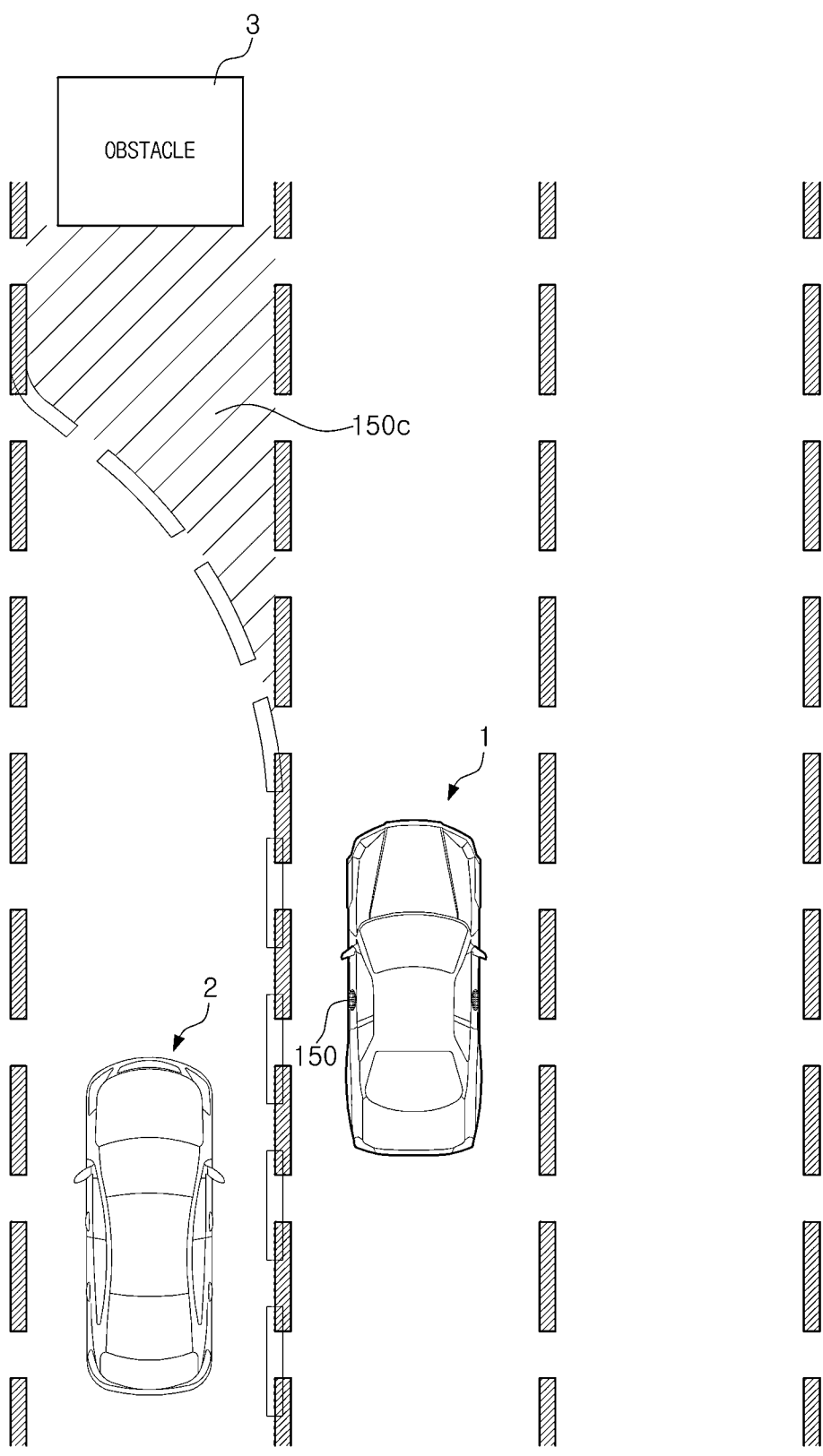
FIG. 6 is a view for describing an example of the driver assist apparatus which assists a nearby vehicle according to one embodiment.

FIG. 6 is a view for describing an example of the driver assist apparatus which assists a nearby vehicle according to one embodiment;

Referring to FIG. 6, the driver assist apparatus 100 may recognize an autonomous driving level of a nearby vehicle 2 on the basis of results of processing data received from at least one of the camera 110, the radar 120, the lidar 130, and the communication part 140. Accordingly, the driver assist apparatus 100 may monitor whether the nearby vehicle 2 needs assistance.

More specifically, in response to the lower autonomous driving level vehicle 2 around the vehicle 1, the driver assist apparatus 100 may recognize an obstacle 3 in front of the vehicle 1 on the basis of the results of processing the data received from at least one of the camera 110, the radar 120, and the LiDAR 130. In this case, the driver assist apparatus 100 may determine that the nearby vehicle 2 needs assistance.

Accordingly, the driver assist apparatus 100 may generate a control signal to control the projection unit 150 to guide a route change of the nearby vehicle 2.

More specifically, the driver assist apparatus 100 may generate a control signal to control the projection unit 150 to project a safety zone with a virtual lane line so that the nearby vehicle 2 may change lanes. Accordingly, the nearby vehicle 2 may change lanes on the basis of the projected virtual lane line 150c.

Figure 7:
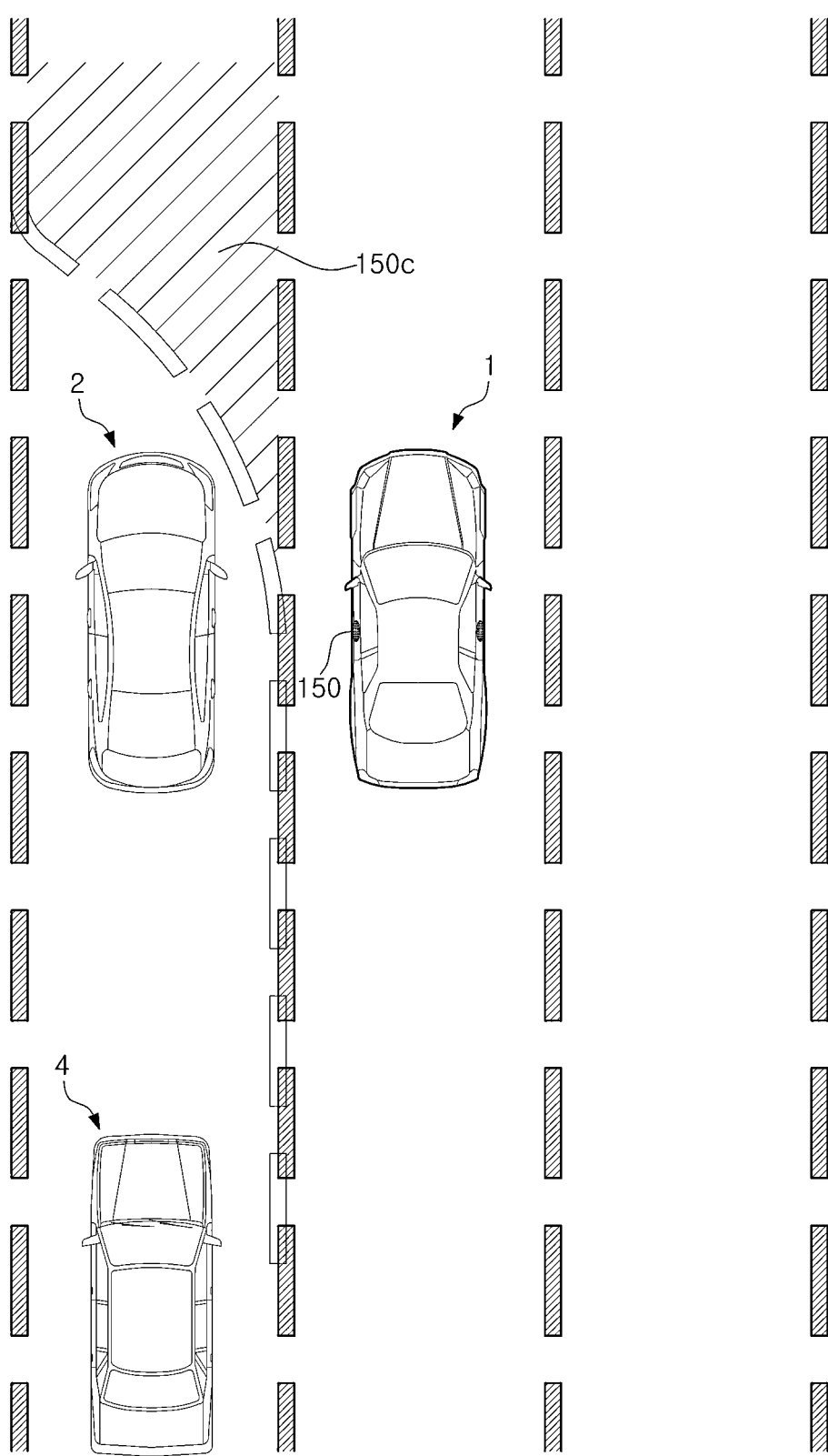
FIG. 7 is a view for describing an example of the driver assist apparatus which assists a nearby vehicle according to one embodiment.

FIG. 7 is a view for describing an example of the driver assist apparatus which assists a nearby vehicle according to one embodiment;

Referring to FIG. 7, the driver assist apparatus 100 may recognize an autonomous driving level of a nearby vehicle 2 on the basis of results of processing data received from at least one of the camera 110, the radar 120, the lidar 130, and the communication part 140. Accordingly, the driver assist apparatus 100 may monitor whether the nearby vehicle 2 needs assistance.

More specifically, in response to the lower autonomous driving level vehicle 2 around the vehicle 1, the driver assist apparatus 100 may recognize an emergency vehicle 4 around the vehicle 1 on the basis of the results of processing the data received from at least one of the camera 110, the radar 120, the LiDAR 130, and the communication part 140. In this case, the driver assist apparatus 100 may determine that the nearby vehicle 2 needs assistance.

Accordingly, the driver assist apparatus 100 may generate a control signal to control the projection unit 150 to guide a route change of the nearby vehicle 2.

More specifically, when the nearby vehicle 2 is present around a route of the recognized emergency vehicle 4, the driver assist apparatus 100 may generate a control signal to control the projection unit 150 to project a safety zone with a virtual lane line to guide the route change of the nearby vehicle 2. Accordingly, the nearby vehicle 2 may change a lane on the basis of the projected virtual lane line 150c, and the driver assist apparatus 100 can prevent the travel of the emergency vehicle 4 from being interfered with the nearby vehicle 2.

Figure 8:
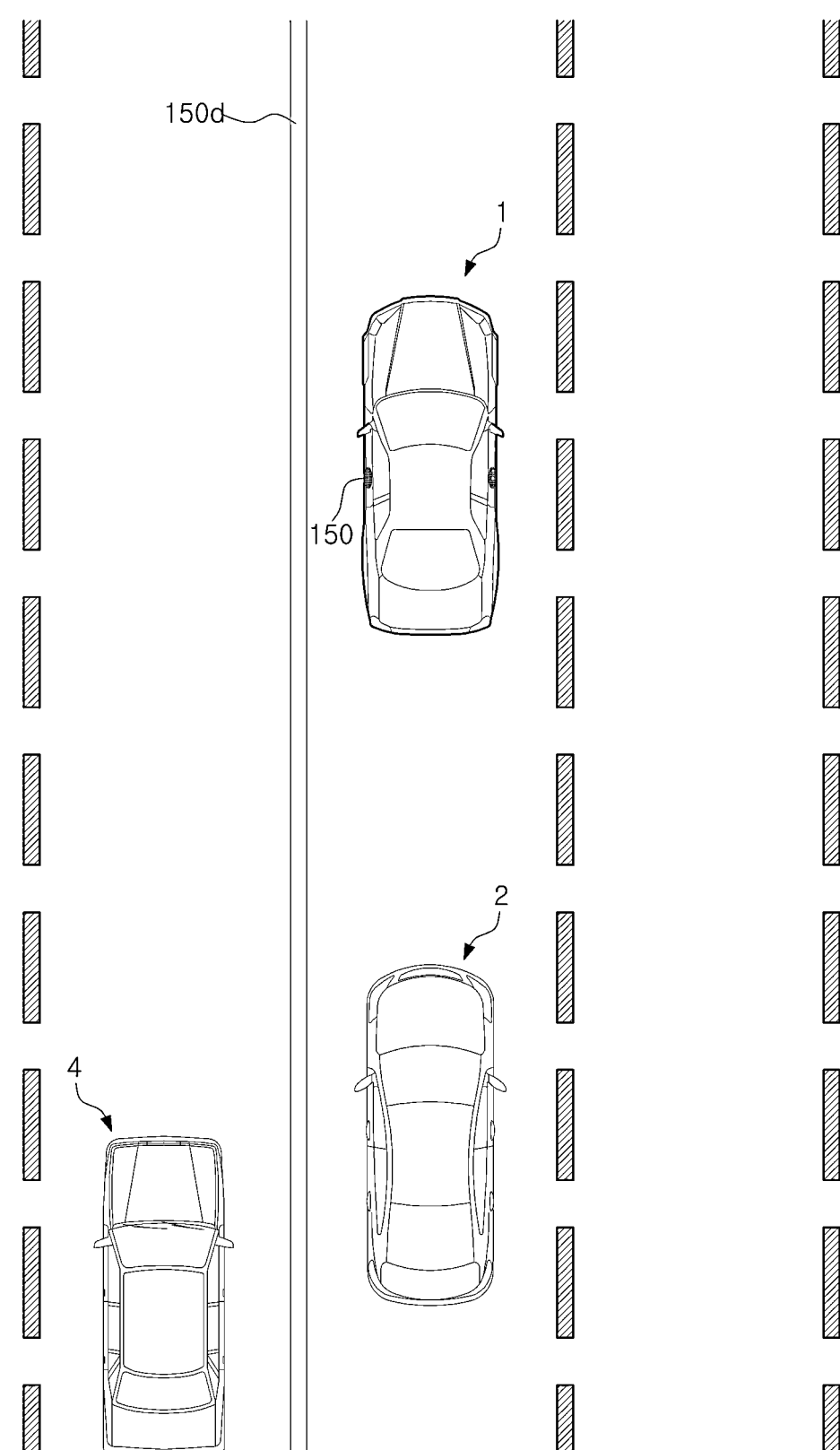
FIG. 8 is a view for describing an example of the driver assist apparatus which assists a nearby vehicle according to one embodiment.

FIG. 8 is a view for describing an example of the driver assist apparatus which assists a nearby vehicle according to one embodiment.

Referring to FIG. 8, the driver assist apparatus 100 may recognize an autonomous driving level of a nearby vehicle 2 on the basis of results of processing data received from at least one of the camera 110, the radar 120, the lidar 130, and the communication part 140. Accordingly, the driver assist apparatus 100 may monitor whether the nearby vehicle 2 needs assistance.

More specifically, in response to the lower autonomous driving level vehicle 2 around the vehicle 1, the driver assist apparatus 100 may recognize an emergency vehicle 4 around the vehicle 1 on the basis of the results of processing the data received from at least one of the camera 110, the radar 120, the LiDAR 130, and the communication part 140. In this case, the driver assist apparatus 100 may determine that the nearby vehicle 2 needs assistance.

Accordingly, the driver assist apparatus 100 may generate a control signal to control the projection unit 150 to prevent a route changed of the nearby vehicle 2.

More specifically, when the nearby vehicle 2 is present out of a route of the recognized emergency vehicle 4, the driver assist apparatus 100 may generate a control signal to control the projection unit 150 to project a virtual lane line 150d using solid lines to prevent the route change of the nearby vehicle 2. Accordingly, the route change of the nearby vehicle 2 can be prevented by the projected virtual lane line 150d, and the driver assist apparatus 100 can prevent the travel of the emergency vehicle 4 from being interfered with the nearby vehicle 2.

At least one component may be added or omitted to correspond to the performance of the components described above. In addition, it may also be easily understood to those skill in the art that mutual positions between the components may change to correspond to the performance or structure of the system.

Figure 9:
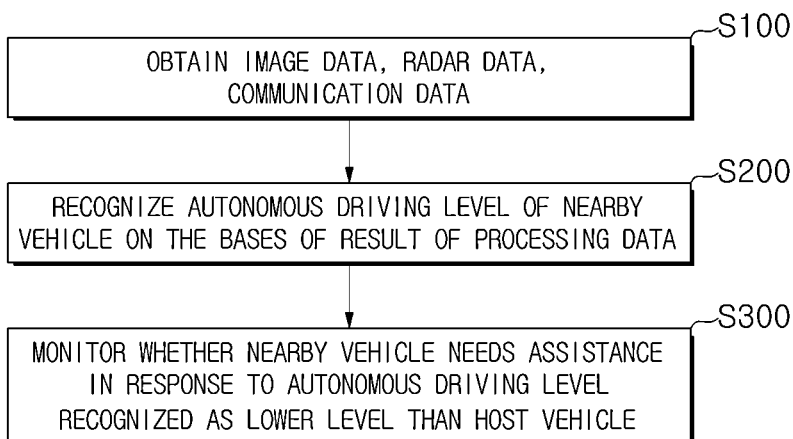
FIG. 9 is a flowchart for describing a method of assisting a driver according to one embodiment.

FIG. 9 is a flowchart for describing a method of assisting the driver according to one embodiment.

The method of assisting the driver illustrated in FIG. 9 may be performed by the vehicle 1, the driver assist apparatus 100, and/or the controller 160 described above. Accordingly, the content described about the vehicle 1, the driver assist apparatus 100, the controller 160 may be equally applied to the description of the method of assisting the driver even when omitted below.

Referring to FIG. 9, the vehicle 1 may obtain image data, radar data, and communication data (S100).

In addition, the vehicle 1 may recognize an autonomous driving level of a nearby vehicle 2 on the basis of results of processing the data (S200).

In addition, the vehicle 1 may monitor whether the nearby vehicle 2 needs assistance on the basis of the recognized autonomous driving level which is a lower level than the vehicle 1 (S300).

According to one aspect of the disclosed invention, an apparatus capable of supplementing a technical problem in a critical situation of a lower autonomous driving level vehicle to assist travel of the vehicle and a method of controlling the same can be provided.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/ or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for driver assistance, the apparatus comprising:

a camera installed on a vehicle, having a field of view outside the vehicle, and including at least one image sensor configured to obtain image data;

a radar installed on the vehicle, having a sensing area outside the vehicle, and including at least one antenna configured to receive a reflection radar signal that is a reflected signal of a transmission signal; and at least one processor configured to:

obtain information on an object around the vehicle on the basis of processing the image data and obtain information on the object around the vehicle on the basis of processing the reflection radar signal, process the information on the object around the vehicle and communication data which is received from a nearby vehicle or an external server through a communication part of the vehicle, identify an autonomous driving level of the nearby vehicle on the basis of processing the information on the object around the vehicle and the communication data, change an autonomous driving level of the vehicle in response to the autonomous driving level of the nearby vehicle identified as a lower level than the autonomous driving level of the vehicle, determine that the nearby vehicle needs assistance in response to receiving accident information in front of the vehicle from an external server, identify existence of a front obstacle based on the received accident information, and control a driving system and a steering system to cut in front of the nearby vehicle or provide a warning to the nearby vehicle based on a distance between the front obstacle and the nearby vehicle to induce deceleration or avoidance of the nearby vehicle.

2. The apparatus of claim 1, wherein the at least one processor is configured to:

attempt communication with the nearby vehicle through the communication part, and identify the autonomous driving level of the nearby vehicle as the lower level on the basis of no reception of a response from the nearby vehicle.

3. The apparatus of claim 1, wherein the at least one processor is configured to:

identify a vehicle type and a model year of the nearby vehicle on the basis of processing the image data, and identify the autonomous driving level of the nearby vehicle on the basis of the vehicle type and the model year of the nearby vehicle.

4. The apparatus of claim 1, wherein the at least one processor is configured to monitor whether the nearby vehicle needs assistance on the basis of processing at least one of the image data and the communication data.

5. The apparatus of claim 4, wherein the at least one processor is configured to determine that the nearby vehicle needs the assistance in response to no recognition of a lane line in front of the vehicle.

6. The apparatus of claim 5, wherein the at least one processor is configured to control a projection unit of the vehicle to project a virtual lane line of the nearby vehicle in the case in which the nearby vehicle needs the assistance.

7. The apparatus of claim 4, wherein the at least one processor is configured to provide a signal to control a projection unit of the vehicle to project a virtual lane line to guide a route of the nearby vehicle in the case in which the nearby vehicle needs the assistance.

8. A method for driver assistance, the method comprising:

obtaining image data by a camera installed on a vehicle;

obtaining radar data by a radar installed on the vehicle;

receiving communication data with a nearby vehicle or external server;

obtaining information on an object around the vehicle on the basis of processing the image data;

obtaining information on the object around the vehicle on the basis of processing the reflection radar signal;

processing the information on the object around the vehicle and the communication data;

identifying an autonomous driving level of the nearby vehicle on the basis of processing the information on the object around the vehicle and the communication data; and changing an autonomous driving level of the vehicle in response to an autonomous driving level of the nearby vehicle identified as a lower level than the autonomous driving level of the vehicle;

determining that the nearby vehicle needs assistance in response to receiving accident information in front of the vehicle from an external server, identifying existence of a front obstacle based on the received accident information; and controlling a driving system and a steering system to cut in front of the nearby vehicle or provide a warning to the nearby vehicle based on a distance between the front obstacle and the nearby vehicle to induce deceleration or avoidance of the nearby vehicle.

9. The method of claim 8, wherein the identifying of the autonomous driving level of the nearby vehicle comprises:

attempting communication with the nearby vehicle; and identifying the autonomous driving level of the nearby vehicle as the lower level on the basis of no reception of a response from the nearby vehicle.

10. The method of claim 8, wherein the identifying of the autonomous driving level of the nearby vehicle comprises:

identifying a vehicle type and a model year of the nearby vehicle on the basis of processing the image data; and identifying the autonomous driving level of the nearby vehicle on the basis of the vehicle type and the model year of the nearby vehicle.

11. The vehicle of claim 8, wherein the changing of the autonomous driving level of the vehicle comprises monitoring whether the nearby vehicle needs assistance on the basis of processing at least one of the image data and the communication data.

12. The vehicle of claim 11, wherein the changing of the autonomous driving level of the vehicle further comprises determining that the nearby vehicle needs the assistance in response to no recognition of a lane line in front of the vehicle.

13. The method of claim 12, further comprising providing a signal to control a projection unit of the vehicle to project a virtual lane line of the nearby vehicle in the case in which the nearby vehicle needs the assistance.

14. The method of claim 11, further comprising providing a signal to control a projection unit of the vehicle to project a virtual lane line to guide a route of the nearby vehicle in the case in which the nearby vehicle needs the assistance.

15. An apparatus for driver assistance, the apparatus comprising:

a camera installed on a vehicle, having a field of view outside the vehicle, and including at least one image sensor configured to obtain image data;

a radar installed on the vehicle, having a sensing area outside the vehicle, and including at least one antenna configured to receive a reflection radar signal that is a reflected signal of a transmission signal; and at least one processor configured to:

obtain information on an object around the vehicle on the basis of processing the image data and obtain information on the object around the vehicle on the basis of processing the reflection radar signal, process the information on the object around the vehicle and communication data which is received from a nearby vehicle or an external server through a communication part of the vehicle, identify an autonomous driving level of the nearby vehicle on the basis of processing the information on the object around the vehicle and the communication data, change an autonomous driving level of the vehicle in response to the autonomous driving level of the nearby vehicle identified as a lower level than the autonomous driving level of the vehicle, determine that the nearby vehicle needs assistance based on the absence of a recognized lane line in front of both the host vehicle and the nearby vehicle, in response to the nearby vehicle being identified as having a lower autonomous driving level, and control a projection unit of the vehicle to project a virtual lane line to replace the nonexistent road in front of the vehicle and the nearby vehicle.

16. A method for driver assistance, the method comprising:

obtaining image data by a camera installed on a vehicle;

obtaining radar data by a radar installed on the vehicle;

receiving communication data with a nearby vehicle or external server;

obtaining information on an object around the vehicle on the basis of processing the image data;

obtaining information on the object around the vehicle on the basis of processing the reflection radar signal;

processing the information on the object around the vehicle and the communication data;

identifying an autonomous driving level of the nearby vehicle on the basis of processing the information on the object around the vehicle and the communication data;

changing an autonomous driving level of the vehicle in response to an autonomous driving level of the nearby vehicle identified as a lower level than the autonomous driving level of the vehicle;

determining that the nearby vehicle needs assistance based on the absence of a recognized lane line in front of both the host vehicle and the nearby vehicle, in response to the nearby vehicle being identified as having a lower autonomous driving level; and controlling a projection unit of the vehicle to project a virtual lane line to replace the nonexistent road in front of the vehicle and the nearby vehicle.

* * * * *